May 10, 1960 A. M. NELSON ET AL 2,936,169

CARD PROCESSING APPARATUS

Filed Feb. 4, 1957 4 Sheets-Sheet 1

INVENTORS:
Alfred M. Nelson
Hans M. Stern
Jerome B. Wiener

By Smyth & Roston
Attorneys

INVENTORS:
Alfred M. Nelson
Hans M. Stern
Jerome B. Wiener
By Smyth & Roston
Attorneys INVENTORS:
Alfred M. Nelson
Hans M. Stern
Jerome B. Wiener By Smyth & Roston Attorneys INVENTORS:
Alfred M. Nelson
Hans M. Stern
Jerome B. Wiener
By Smyth & Roston
Attorneys United States Patent Office 2,936,169
Patented May 10, 1960

2,936,169

CARD PROCESSING APPARATUS

Alfred M. Nelson, Redondo Beach, Hans M. Stern, Culver City, and Jerome B. Wiener, Granada Hills, Calif., assignors to Magnavox Company, Los Angeles, Calif., a corporation of Delaware Application February 4, 1957, Serial No. 638,033
27 Claims. (Cl. 271—5)

The present invention relates to apparatus for handling information cards as they are circulated on a vacuum pressure transporting drum or the like. The invention is more particularly concerned with handling apparatus which includes a holding member for removing a card from the transporting drum for a controllable time interval. In this way, the handling apparatus is able to control the position of the card on the drum or to delay the transfer of the card to a second drum, or for any other purpose.

Systems have been devised in recent years for selecting, storing, filing, collating, sorting and for otherwise processing recorded data on a plurality of information cards. The data may be recorded on these cards by a series of selectively positioned holes, or by discrete areas of different magnetic polarities. The data may also be recorded on a photographic basis such as on a basis in which black areas represent particular information and white areas represent other information. The data may also be recorded on a combined magnetic and photographic basis or in any other suitable way.

An improved data processing system has recently been devised which is capable of performing all the handling operations listed in the preceding paragraph. For the purpose of this description, the information or data is preferably recorded on the cards in the form of magnetic polarized areas. The improved system of the invention utilizes rotatable drums in which vacuum pressure is produced at their peripheral edges. This vacuum pressure enables the information cards to be firmly retained on the peripheries of the drums so that they may be conveniently transported by the drums from one position to another. Appropriate gates and other auxiliary mechanisms have also been devised for transferring the cards from various storage stacks to the drums and from one drum to another.

In rearranging the order of a series of the cards in the systems referred to above, it is often desirable for the position of one card on the peripheral surface of a transporting drum to be changed with respect to other cards in the series. This operation has usually been carried out in the prior art systems by gating the card whose position was to be changed to an adjacent holding drum and by subsequently returning the card to the original drum. These arrangements operated satisfactorily to achieve their desired purpose. However, as compared with the present invention, the prior art arrangements are somewhat slow and require relatively complicated equipment.

The present invention provides simple means by which the position of a card on a transporting drum can be selectively altered with respect to the positions of other cards transported by that drum or by other drums.

A feature of the mechanism of the invention is the simplicity of its construction, coupled with the fact that it may be operated by an uncomplicated and inherently simple control system. Moreover, the mechanism of the invention is advantageous in that it does not produce any extraneous interruptions, in the handling operations performed on the cards by the system with which it is associated.

The invention includes a holding member positioned adjacent the periphery of a transporting drum and means for controllably introducing a vacuum pressure to the surface of the holding member facing the peripheral surface of the drum. When such a vacuum pressure is established at that surface of the holding member, this vacuum pressure serves to overcome the retaining effect of the drum on the cards, so that a particular card may be held by the holding member against rotation by the drum.

In one embodiment of the invention, a card is held stationary by the holding member with a portion of the card engaging the periphery of the drum while the drum rotates. Preferably the trailing portion of the card may be disposed against the holding member and the leading portion of the card may be disposed against the periphery of the drum. This holding operation may be continued for a selected interval so as to change the position of the card on the drum or to delay its transfer to another drum.

In another embodiment of the invention, the particular card also becomes retained by the holding member against movement with the drum. However, the particular card becomes so positioned relative to the holding member and the periphery of the drum that successive cards are able to move with the drum past the particular card. This latter embodiment enables the position of the particular card to be changed in a simple and straightforward manner with respect to the positions of other cards on the periphery of the drum.

In the drawings:

Figure 2 is an enlarged sectional view substantially on the line 2—2 of Figure 1 and shows details of a typical vacuum pressure transporting drum which may be included in the apparatus of the invention;

Figures 6, 7:
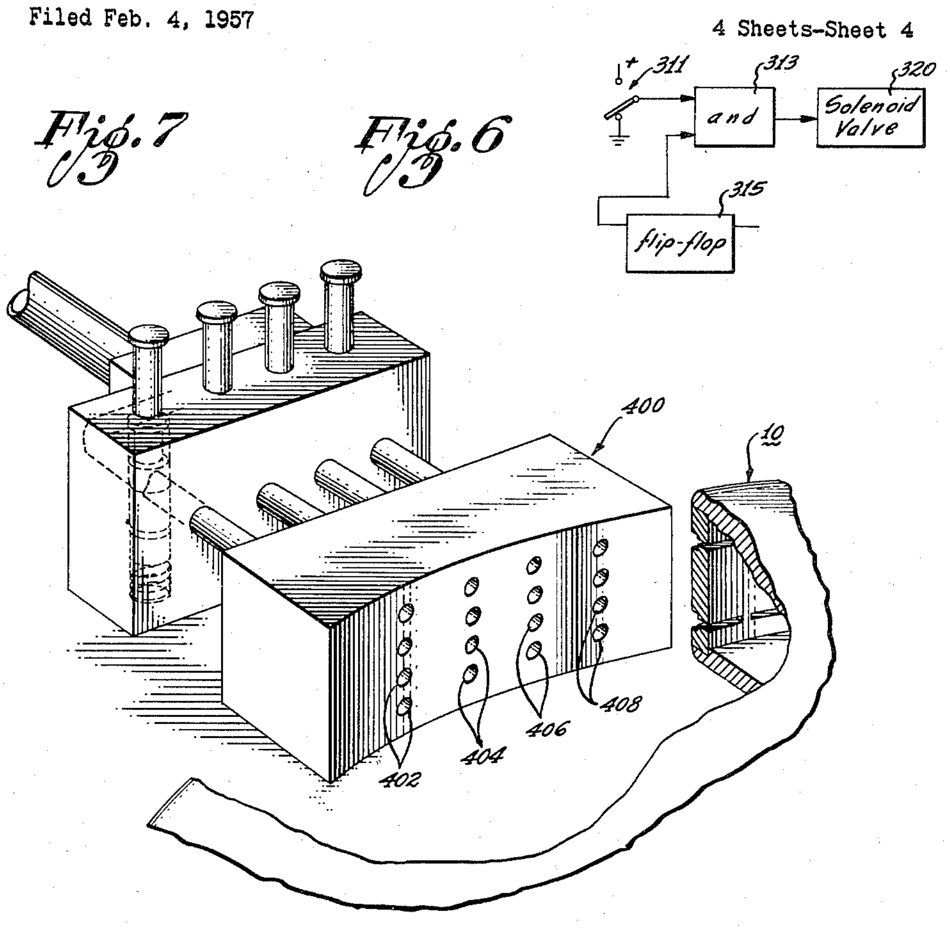
Figure 6 is a simplified circuit diagram, partly in block form, of certain electrical features associated with the embodiment of the holding member shown in Figure 5.
Figure 8:
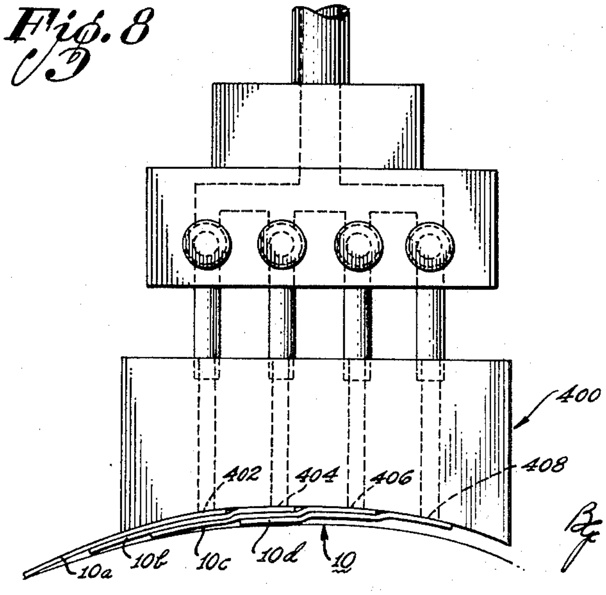

Figure 7 is an enlarged fragmentary perspective view of still another embodiment of the invention, this embodiment including a holding member for simultaneously retaining a plurality of cards against fixed movement; and Figure 8 is an enlarged fragmentary top plan view of the card holder shown in Figure 7 and illustrates how the card holder shown in Figure 7 operates to simultaneously retain a plurality of cards in fixed position.

The apparatus of the invention includes a vacuum transport drum 10 which is rotatably mounted on a table top 11, only a fragment of the table top being shown. The drum 10 is constructed in a manner to be described in detail subsequently and serves to transport information cards on its peripheral surface.

An input stack 14 is positioned with its mouth contiguous to the peripheral surface or peripheral edge of the drum 10 at the illustrated angular position. This input stack serves to hold a plurality of information cards in a stacked condition with the cards extending generally vertically and with the lower edges of the cards resting on the table top 11.

The cards are moved forwardly in the stack 14 by suitable resilient biasing means (not shown) so that the face of the leading card is moved against the peripheral edge of the drum 10. This leading card comes under the influence of the vacuum pressure provided at the peripheral surface of the drum. Because of the vacuum pressure on the periphery and because of its rotation, the drum acts on the leading card in the stack in a manner for removing the cards from the stack. However, the removal of the card is prevented by a retaining member 16. The retaining member 16 may be constructed in accordance with the equipment disclosed and claimed in copending application Serial No. 552,506, filed December 12, 1955, for Hans M. Stern.

The retaining member extends into the trailing edge of the stack 14 with respect to the rotation of the drum 10. It has a face 18 which engages the surface of the leading card. A conduit 20 extends through the retaining member 16 and communicates with an orifice, or series of orifices, at the face 18. A vacuum pressure feedline 22 is secured to the retaining member 16 by any suitable coupling means, and this feedline communicates with the conduit 20.

The feedline 22 communicates with a vacuum pump (not shown); and a solenoid valve 24 of appropriate known construction, or any other suitable control means, is positioned in the feedline selectively to control the vacuum pressure in that line. The solenoid valve is controlled by a suitable control source, which is not specifically shown.

Whenever the vacuum pressure from the vacuum pump is introduced by the feedline 22 to the conduit 20, the orifices in the face 18 of the retaining member 16 exert a vacuum pressure on the leading card in the stack 14. This vacuum pressure is sufficient to overcome the force exerted on that card by the vacuum pressure at the peripheral edge of the drum 10. The cards, therefore, are retained in the stack 14 so long as a vacuum force is produced at the orifices in the face 18 of the retaining member 16. However, under the control of the solenoid valve 24, the vacuum pressure at these orifices can be intermittently or continuously interrupted to permit one or more cards to be fed by the stack 14 onto the peripheral edge of the drum 10. Any cards so fed to the drum 10 are firmly retained on the peripheral edge of the drum and are transported by the drum.

Transducer means 26 are positioned on the table top 11 adjacent the drum 10. The transducer means are displaced slightly from the input stack 14 in the direction of rotation of the drum. The transducer means 26 may be of known construction and may include a plurality of transducer heads. Each transducer head may become disposed in contiguous relationship to a different row of recorded data on the card transported by the drum as the cards are transported past the heads.

A holding station 30 is also mounted on the table top 11 and is positioned adjacent the periphery of the drum 10. This holding station may be displaced angularly from the transducer means 26 by a slight amount in the direction of rotation of the drum. The structural details of the holding station 30 will be described in detail subsequently.

The holding station 30 includes a holding member having a surface facing the periphery of the drum 10 and spaced slightly from that periphery. Means are provided for establishing a vacuum pressure at the surface of the holding member. This vacuum pressure is sufficient to overcome the vacuum pressure at the periphery of the drum 10. The holding member, therefore, serves to hold any card transported to it by the drum 10 against further rotation by the drum until the vacuum pressure is removed from the holding member.

A second drum 32 may be rotatably mounted on the table top 11 adjacent the drum 10. The constructional details of the drum 32 may be similar to those of the drum 10. For that reason, only the constructional details of the drum 10 will be described in detail subsequently.

The drum 10 may be rotatable in a counterclockwise direction, and the drum 32 may be rotatable in a clockwise direction. A pneumatic gate 34 is positioned adjacent the contiguous positions of the drums 10 and 32. This gate may be constructed in a manner similar to that described in copending application Ser. No. 562,154 filed January 30, 1956, by Stuart L. Peck et al. The gate serves to transfer selected cards from the drum 10 to the drum 32. The constructional details of one embodiment of the gate 34 will be described in conjunction with Figure 3. However, when so desired, the gate 34 may have a mechanical construction such as described in copending application Serial No. 529,886 filed August 22, 1955, for Alfred M. Nelson et al., or any other suitable construction.

Transducer means 36 are mounted on the table top 11 and are positioned adjacent the periphery of the drum 32. The transducer means 36 are spaced angularly by a slight amount in the direction of rotation of the drum 32 from the contiguous position between the drums 10 and 32.

The transducer means 36, like the transducer means 26, may be of known construction, and it may likewise comprise a series of individual transducer heads each associated with a different row of magnetically recorded data on the cards transported by the drum 32.

An output stack indicated generally at 38 is mounted on the table top 11 and is positioned to have its card-receiving end disposed adjacent the peripheral edge of the transporting drum 32. The stack 38 has an adjustable stop member 40 mounted on the table top adjacent its trailing edge with respect to the direction of rotation of the drum 32. The stop member has a protruding portion which extends to the periphery of the drum 32 and which serves to arrest the motion of cards transported by the drum 32.

A pawl 42 is mounted adjacent the drum 32 and is displaced angularly from the stop 40 by a distance which is less than the length of the individual information cards. The pawl 42 has end portions which extend into annular slots in the drum 32 and it has a center portion which is humped outwardly from the periphery of the drum 32.

The construction of the output stack 38 and the associated stop member 40 and pawl 42 may be similar to that described in copending application Serial No. 538,111, filed October 3, 1955, by Robert M. Hayes et al. Any card transported by the drum 32 is brought into the stop member 40 and is held with its trailing edge removed from the periphery of the drum 32 by the pawl 42. The next card then passes under the preceding card and is also arrested by the stop member 40. This succeeding card causes the preceding card to be deposited in the output stack 38. In this manner, all cards transferred to the drum 32 by the gate means 34 may first be processed by the transducer means 36 and may then be deposited in their proper sequence in the output stack 38. This depositing is achieved by the stop member 40 and by the pawl 42. These cards are supported in the output stack 38 in a generally stacked condition in individual vertical planes and with their lower edges resting on the table top 11.

An output stack indicated generally at 44 is mounted on the table top 11 and is disposed with its mouth adjacent the periphery of the drum 10. This latter output stack is positioned with respect to the drum 10 at a position displaced in the direction of rotation of the drum from the position of contiguity between the drum 10 with the transporting drum 32.

The output stack 44 may be similar in its construction to the output stack 38 and may be provided with a corresponding stop member 46 mounted adjacent its trailing edge. The stack 44 also has an associated pawl 48 displaced against the direction of rotation of the drum 10 from the stop member 46 and by a distance that is slightly less than the length of the cards transported on the periphery of the drum 10.

Figures 1, 3:
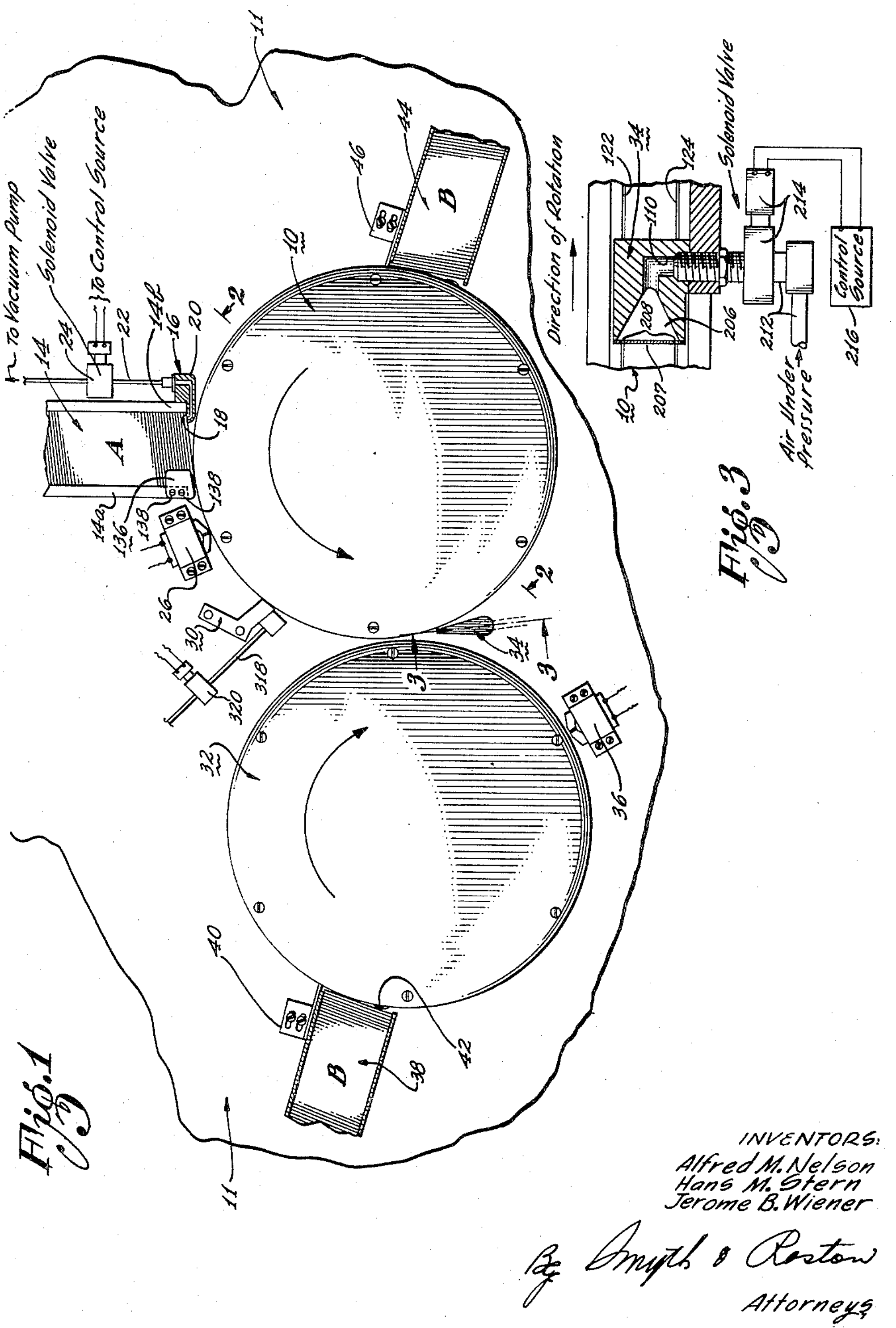
Figure 1 is a top plan view somewhat schematically illustrating the apparatus of the invention and showing a rotatable transporting drum and a holding member, together with associated controls and auxiliary mechanisms for controlling the position of selected information cards on the periphery of the drum.
Figure 3 is a sectional view substantially on the line 3—3 of Figure 1 and illustrates in specific detail a pneumatic gate used in the illustrated system of the invention.
Figure 3:
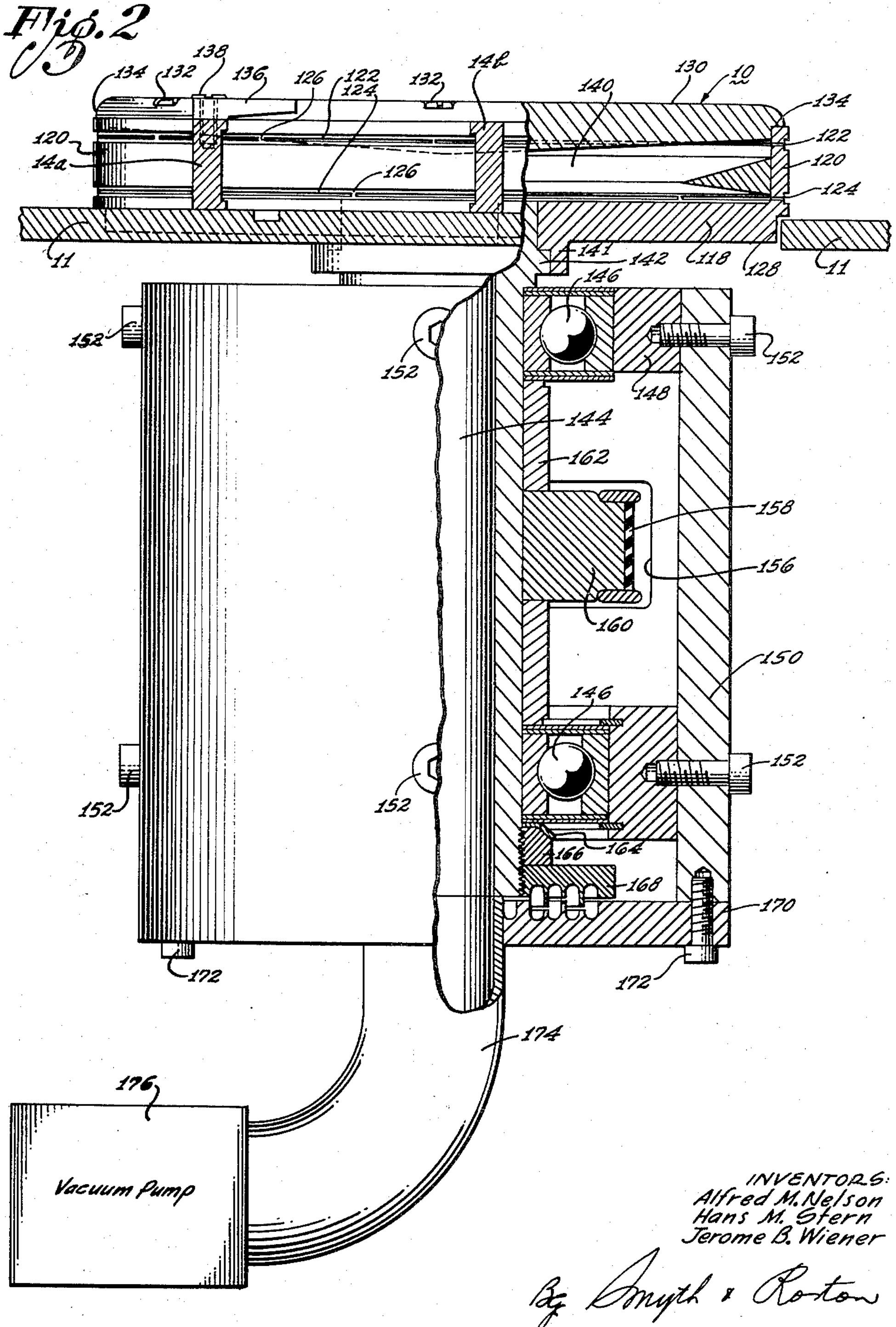

In the system of Figure 1, the cards in the input stack 14 may be controllably released in a one-by-one sequence to the periphery of the drum 10 and under the control of the solenoid valve 24 in the described manner. The cards so fed to the periphery of the drum 10 are scanned by the transducer means 26. This transducer means may, by an appropriate control system, control the operation of the hold station 30 and of the gate 34. That is, certain cards processed by the transducer means 26 may cause the control system to activate the gate 34 so that such cards may be transferred to the drum 32 for further processing by the transducer means 36. The cards, after such further processing, are then deposited in the output stack 38 in the described manner.

Certain cards processed by the transducer means 26 may, on the other hand, cause the control system to activate the hold station 30 so that a particular card may be held by the hold station against the rotation of the drum 10. This holding may delay the transfer of that card by the gate 34 to the drum 32 until other cards have been fed to the latter drum by other adjacent drums or input stacks (not shown). Alternately, the particular card may be held by the hold station 30 until other cards are fed to the drum 10 either by the input stack 14 or by other input stacks and contiguous drums (not shown).

The retention of the particular card by the hold station 30 facilitates the handling of the cards in different types of data processing systems. For example, such retention of cards may be advantageous when cards from a plurality of stacks are to be merged or collated or when cards from one or more stacks are to be sorted. The time interval for the retention of the particular card by the hold station is controllable by suitable electrical control signals as will be described. Also, as will be described in conjunction with Figure 5, the card held by the hold station may be disposed relative to the periphery of the drum 10 and to the hold station to provide for the movement of other cards past the retained card in accordance with the movements of the drum. This permits the position of the held card to be conveniently changed for sorting and other purposes with respect to the actual positions of other cards transported on the peripheral edge of the drum 10.

The drums 10 and 32 may be constructed in a manner similar to that described in copending application Serial No. 600,975, filed by Loren R. Wilson on July 30, 1956, and entitled "Card Processing Apparatus," now U.S. Patent No. 2,883,189. Details of the drum 10 are shown, for example, in Figure 2. As previously stated, the drum 32 may have a similar construction.

As fully described in the copending Wilson application Serial No. 600,975, the drum 10 is provided with a lower section and an upper section. The lower section includes a disc-like bottom portion 118 and an integral annular side portion 120. A pair of axially spaced peripheral orifices 122 and 124 extend through the side portion 120. The orifices 122 and 124 may extend completely around the periphery of the side portion 120. In order to retain the integral construction of the side portion 120, the side portion may be reinforced at its inner surface by a plurality of ribs 126. Each of the ribs 126 may have only a limited axial length so as to cover only one or the other of the orifices 122 and 124. The posts or ribs 126 interrupting the orifice 122 are preferably staggered with respect to the ribs interrupting the orifice 124. The ribs are staggered so that the orifices will not weaken the integral characteristics of the side portion 120. The staggering of the ribs 126 also insures that a vacuum pressure will be provided at the periphery of the drum 10 at every annular position about the periphery of the drum. Furthermore, since the slots or orifices 122 and 124 are formed in the side member 120, there can be no leakage of air through openings other than the orifices to destroy the vacuum pressure at the orifices.

The disc-like bottom portion 118 of the lower section is undercut, as shown at 128. This enables the table top 11 to extend beyond the outer limits of the side portion 120 so that the side portion overlaps the table top in the manner shown. Therefore, the cards supported endwise on the table top by the input stack 14 and by the other stacks have no tendency to slip down between the table and the drum and become misplaced or damaged.

The upper section of the drum 10 is in the form of a disc-like member 130 which engages the annular side member 120 of the lower section. The upper section 130 forms an enclosure with the lower section of the drum, with the upper section parallel to the disc-shaped bottom portion 118 of the lower section. The upper section 130 is held in place on the side portion 120 as by a series of screws 132.

The upper section 130 is undercut, as shown at 134, and has a smaller diameter than the outer diameter of the annular side portion 120 to permit a guide member 136 to be positioned adjacent the drum in a manner now to be described.

When one of the cards is fed from the input stack 14 to the drum 10, it is held on the outer peripheral surface of the side portion 120 by vacuum pressure. It is important that the cards be fed to this peripheral surface in an accurately oriented position so that they may be properly processed in the system.

To assure the proper orientation of the cards on the peripheral surface of the drum 10, a guide member 136 is mounted on the end of the wall 14*a* adjacent the drum. The guide member 136 is held in place by suitable set screws 138. The guide member has a bottom surface which is beveled downwardly in a direction toward the drum 10 and this beveled surface directs the cards to the periphery of the drum 10 for proper positioning and orientation on that periphery.

A deflector ring 140 is supported within the interior of the drum 10 in press fit with the inner surface of the annular side portion 120. This deflector ring is tapered towards the center of the drum to minimize the turbulence of the air flowing through the drum and to provide a streamlined path for air that is drawn in through the orifices 122 and 124. The undersurface of the upper section 130 is bulged so as to have a convex shape. This convex shape cooperates with the ring 140 in providing a smooth path for the air drawn in through the orifices 122 and 124.

The portion 118 of the lower section of the drum 10 contains a central opening which is defined by an annular collar 141. The collar 141 fits on a second collar 142 positioned at the end of a shaft 144, which extends into the opening in the lower portion 118 in friction fit with that portion. Therefore, rotation of the hollow shaft 144 causes the drum 10 to rotate. Moreover, the interior of the shaft 144 communicates with the interior of the drum 10. Bearings 146 are provided at opposite ends of the shaft 144. The inner races of the bearings 146 are mounted on the shaft 144, and the outer races of these bearings are disposed against bushings 148 which are secured to a housing 150 by a series of studs 152.

An opening 156 is provided in the housing 150 between the bearings 146 so that a drive belt 158 may extend through the opening into the housing and around a pulley 160. The pulley 160 is affixed to the shaft 144 between the bearings 146 and is held against axial movement by a pair of sleeves 162. These sleeves are mounted on the shaft 144 and are respectively poistioned between the pulley 160 and the bearings 146.

The bearings 146 and the sleeves 162 are held on the shaft 144 by a nut 166. This nut is screwed on a threaded portion at the bottom of the shaft, and a lockwasher 164 is interposed between it and the lower bearings 146. A sealing disc 168 is also screwed on the threaded portion at the bottom of the shaft 144. The sealing disc 168 operates in conjunction with a bottom plate 170 to resist the movement of air between the interior of the housing 150 and the interior of the hollow shaft 144 when a pressure differential exists between the housing and the shaft.

The bottom plate 170 is secured to the housing 150 by a plurality of studs 172, and this bottom plate has a central annular opening. A hollow conduit 174 extends into the opening in the bottom plate 170 and in frictional fit with that plate. The conduit 174 is axially aligned with the hollow shaft 144 so that air may be exhausted from the hollow interiors of the shaft and the conduit by a vacuum pump 176. This pump may be of any suitable known construction, and, for that reason, is shown in block form.

The vacuum pump 176 draws air in through the orifices 122 and 124 and through the interior of the drum 10 down the shaft 144 and through the conduit 174. This creates a vacuum pressure at the outer peripheral surface of the annular portion 120 of the lower section of the drum 10. The deflector ring 140 and the convex underside of the section 130 assures that the air will flow smoothly and with a minimum of turbulence. This assures a high and adequate vacuum pressure around the outer surface of the annular side portion 120 firmly to retain the cards on that surface.

The gate 34 is disposed between the vacuum transport drums 10 and 32. This gate is positioned in generally tangential relationship with the periphery of the drum 10, but it is spaced from that periphery a distance sufficient to allow the cards on that drum to be circulated between it and the drum. Although one type of gate is shown in detail in Figures 1 and 3, it should be appreciated that other types of gates can also be used, as mentioned previously. As illustrated in Figure 1, the gate has a plan shape corresponding substantially to a teardrop, and it is symmetrical about its central axis. This central axis, as previously noted, is essentially tangential to the periphery of the drum 10.

The gate 34 has a tapered configuration such that its narrow end or mouth is near the periphery of the drum 10. It has a hollow interior of essentially parabolic shape which defines a mouth portion 206 (Figure 3). A plate 207 is mounted across the mouth portion of the gate and is provided with a series of apertures 208 which extend through the plate and which are respectively aligned with the slots 122 and 124 in the drum 10.

The gate 34 is so positioned that air under pressure may pass through the mouth portion 206 and out through the mouth portion 206 and out through the apertures 208 along the peripheral surface of the drum 10. A passageway 110 extends through the gate and communicates with the mouth portion 206. A feedline 212 is coupled to the other end of the passageway 110 by any suitable coupler. The other end of the feedline 212 is adapted to receive air under pressure from any suitable air source (not shown).

A suitable valve 214 is disposed in the feedline 212 to control the flow of air through the line. This valve may be actuated in known manner by a solenoid. A suitable control source 216 may be provided for controlling the times that the solenoid becomes energized to actuate the valve 214. The valve is opened whenever the solenoid is energized. When the solenoid is energized and the valve is opened, air under pressure passes to the gate 34. This air flows through the passageway 110 and through the mouth 206 of the gate. The air emerges from the apertures 208 as streams of air under pressure.

The streams of air emerging from the apertures 208 have a relatively high velocity because of the relatively small diameter of the apertures. These streams, therefore, impinge on the periphery of the drum 10 with relatively high force. This impingement of the streams is in a tangential direction such that the streams exert a shearing force between the periphery of the drum 10 and the leading edge of the particular card on the drum which they contact so as to shear that card from the drum. The streams lift the leading edge of the particular card from the periphery of the drum 10 in opposition to the retaining vacuum pressure exerted on the card through the peripheral channel of the drum.

After being lifted from the periphery of the drum 10, leading edge of the particular card comes under the influence of the vacuum pressure at the periphery of the drum 32. Subsequent rotation of the drum 10 moves the card under the influence of the gate 34 so that the entire card comes under the influence of the vacuum pressure at the peripheral edge of the drum 32. In this way, a card is transferred from the drum 10 to the drum 32 when the solenoid valve 214 is energized.

Figure 4:
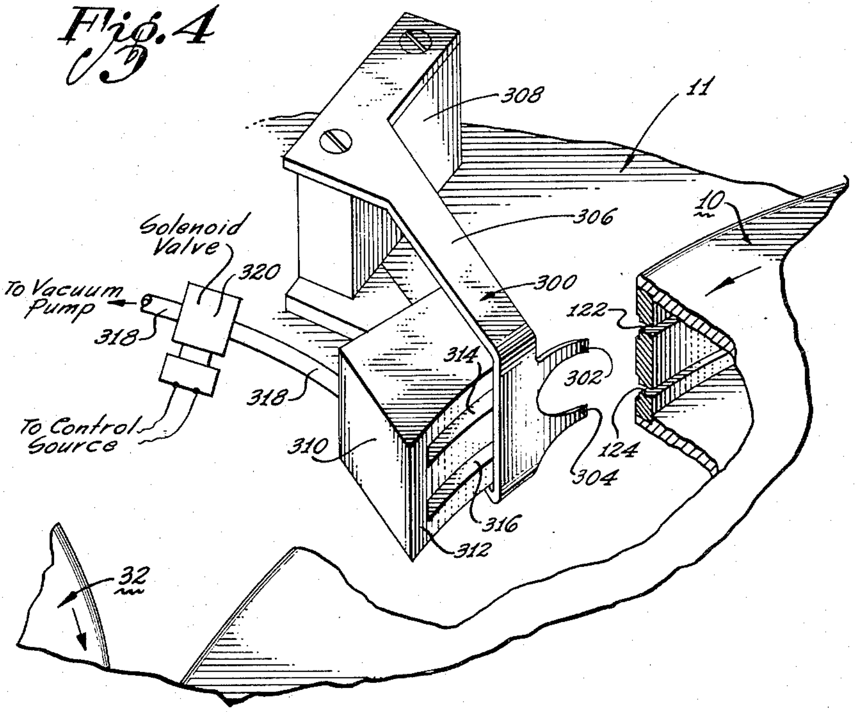
Figure 4 is an enlarged fragmentary perspective view of a portion of the apparatus shown in Figure 1 and particularly shows a holding member comprising one embodiment of the invention and the control equipment associated with the holding member.

In the embodiment of the hold station of the present invention shown in Figure 4, the peripheral orifices 122 and 124 of the drum 10 have respective continuous annular grooves formed on the outer surface of the peripheral edge of the drum 10. These grooves extend around the drum adjacent the respective entrances to the orifices 122 and 124.

The hold station of Figure 4 includes a pawl member 300 having a pair of fingers 302 and 304 which extend respectively into the annular grooves in the drum 10 adjacent the orifices 122 and 124. The extremities of these fingers extend into the grooves flush with the outer surface of the peripheral edge of the drum 10. However, the respective intermediate portions of the fingers are humped outwardly in a radial direction from the peripheral edge of the drum.

The fingers 302 and 304 are supported by means of a rectangular-shaped bracket 306 which, in turn, is secured to a block 308 for supporting the bracket on an appropriate stationary surface.

The arrangement is such that any card that is transported on the periphery of the drum 10 to the hold station is carried over the fingers 302 and 304 of the pawl means, and such card is moved along the fingers outwardly from the peripheral edge of the drum 10.

The hold station of Figure 4 also includes a holding member 310. This member has an arcuate-shaped surface 312 which faces the peripheral edge of the drum 10 and which is spaced from that edge. The holding member 310 is supported in the bracket 306 and its surface 312 is spaced from the fingers 302 and 304 and from the portion of the bracket 306 which lies in substantially the same plane as the fingers. This spacing corresponds to approximately the thickness of each of the cards transported by the drum 10. Thus, in the absence of any further restraining force, any card transported to the hold station by the drum 10 rides up over the fingers 302 and 304 and through the bracket 306 between that bracket and the arcuate surface 312 of the holding member 310.

The holding member 310 is generally hollow to define a chamber. The surface 312 has a pair of arcuate slots 314 and 316 which extend along that surface and which may be in alignment with the orifices 122 and 124 in the peripheral edge of the drum 10. A vacuum pressure feedline 318 couples the chamber defined in the holding member 310 to a suitable vacuum pump such as the pump 176 in Figure 2. A valve 320 is interposed in the line 318, and this valve may be solenoid-controlled in known manner. The energizing winding of the solenoid controlling the valve 320 is connected to a suitable electrical control source which also is not shown. Whenever the solenoid winding is energized, the valve 320 is opened to permit the vacuum pump to draw air inwardly through the slots 314 and 316 and through the chamber in the holding member 310. This creates a vacuum pressure at the surface 312 of the holding member 310.

When the solenoid winding of the valve 320 is so energized, the next card transported by the drum 10 to the fingers 302 and 304 is moved up by the fingers and by the end of the bracket 306 until it covers the surface 312 of the holding member 310. The vacuum pressure exerted by the slots 314 and 316 is then sufficient to hold the card stationary. The card is so held against the force exerted on it by the drum 10, and with its trailing edge engaging the periphery of the drum 10 and while the drum continues to rotate. As previously noted, this holding may continue for a selected interval to change the position of the particular card on the periphery of the drum 10 for any particular reason, or to delay the transfer of that card to the drum 32, or to fulfill any other particular requirement. At the end of the interval, the card may be released by de-energizing the solenoid controlling the valve 320. The card now is able to continue to be transported by the drum 10.

Figure 5:
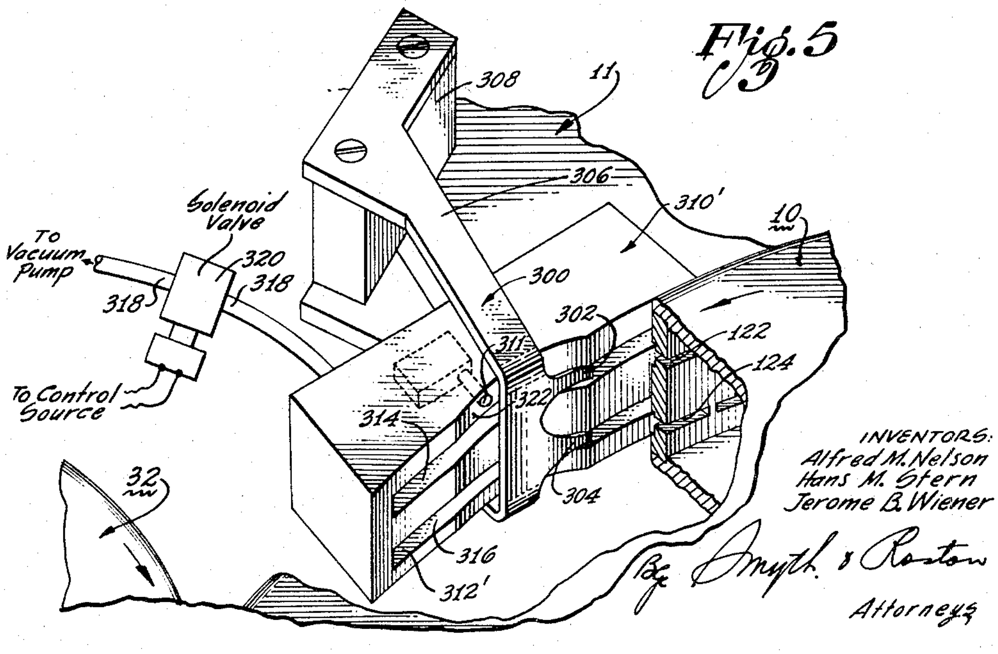
Figure 5 is an enlarged fragmentary perspective view similar to that of Figure 4 and shows a holding member constructed in accordance with a second embodiment of the invention.

The embodiment of Figure 5 is similar in some respects to that of Figure 4. For this reason, like elements in Figure 5 have been designated by numerals corresponding to those used in Figure 4.

In the embodiment of Figure 5, the holding member is designated at 310′. This latter holding member is formed with a recess 322 in its surface 312′. The surface 312′, like the surface 312 of the member 310, has a generally arcuate configuration and faces the peripheral edge of the drum 10 in spaced relation with that edge.

The fingers 302 and 304 and the end of the bracket 306 of the pawl member 300 fit in the recess 322. As before, the fingers 302 and 304 engage the outer grooves in the drum 10 adjacent the entrance to the peripheral orifices 122 and 124 in the drum 10. The intermediate portion of these fingers and the end of the bracket 306 are humped radially outwardly from the peripheral edge of the drum. The longitudinal dimensions of the holding member 310′ are somewhat less than the length of each card. This causes the forward end of the card to become disposed against the holding member when the holding member is rendered operative by the withdrawal of air through the slots 316 and 318. By making the suction force exerted by the holding member 310′ on the card exceed the suction force exerted by the drum on the card, the card can be retained in fixed position against the holding member is spite of the action by the drum on the card.

A switch 311 can be included to insure that the leading edge of each card to be retained in fixed position by the holding member 310′ reaches the drum 10. The switch 311 is mounted on the holding member 310′ at a position to institute a retarding action by the holding member 310′ at the time that the leading edge of the card is returning to the periphery of the drum after travelling along the fingers 302 and 304. The switch 311 is positioned to take account of the delay in time required for the solenoid valve 320 to become energized and opened and the time required for vacuum pressure to be produced at the slots 314 and 316 of the holding member 310′.

The switch 311 can be included in stages to energize the solenoid valve 320 only when it is operated by particular cards. For example, the switch 311 may operate on a single-pole, double-throw basis and may be the type of switch known as a "Microswitch." A first one of the station contacts on the switch 311 may be grounded and the second stationary contact may have a positive voltage applied to it. The switch may be in a normal state of operation in which the movable contact of the switch is spring-loaded to engage the first stationary contact.

The movable contact of the switch 311 may be connected to an input terminal of an "and" network 313 (Figure 6) having another input terminal connected to a control stage such as a flip-flop 315. The "and" network 313 may operate on a conventional basis such that a signal is able to pass through the "and" network only when positive voltages of high amplitude are simultaneously introduced to the "and" network from the switch 311 and the flip-flop 315. The signals passing through the "and" network 313 may be introduced to the solenoid valve 320 to energize and open the valve.

The "and" network 313 is normally not able to pass an energizing signal to the solenoid valve 320 since the movable contact of the switch 311 is grounded by its engagement with the first stationary contact of the switch. At certain times, the "and" network 313 passes a signal when a card passes along the holding member 310′ and drives the movable contact of the switch 311 into engagement with the second stationary contact of the switch. The "and" network passes a signal at such time since it receives a high voltage from the movable contact of the switch 311. Since the "and" network 313 passes a signal, the solenoid valve 320 becomes energized and opened and a vacuum pressure is produced in the slots 314 and 316 to retain the card in fixed position against the holding member.

It should be appreciated that the proper timing for the operation of the holding member 310′ can be obtained without including the switch 311. The proper operation of the holding member 310′ can be obtained by selecting the proper characteristics for the solenoid valve 320 and the holding member 310′. By selecting the proper characteristics for these members, the holding member 310′ may start to exert a vacuum force of sufficient intensity to retard the card at the time that the leading edge of the card is returning from the holding member to the drum 10.

When a card is retained by the holding member 310′ in fixed position along the surface 312′ of the holding member 310′, the vacuum pressure at the slots 314 and 316 is effectively blocked. Other cards, therefore, may move with the drum up and over the fingers 302 and 304 of the pawl member 300 and past the hold station. In this instance, the spacing between the fingers 302 and 304 and the surface 312′ of the member 310 is made sufficiently great so that there is still room for a second card to ride along the fingers 302 and 304 and past the hold station even when a card is retained in fixed position against the surface 312′ of the holding member.

The second card comes between the drum and the leading edge of the first card so as to pry the leading edge of the first card from the drum and so as to move with the drum past the first card. As soon as the second card moves with the drum past the leading edge of the first card, the leading edge of the first card becomes attracted back to the periphery of the drum because of the vacuum pressure on the periphery of the drum. In this way, the first card is able to move with the drum when the vacuum pressure in the holding means 310' is interrupted.

As mentioned previously, this latter construction enables a card not only to be held and shifted in position on the drum 10, but it also permits other cards on the drum 10 to be moved past the card held at the hold station. This enables the position of the latter card to be conveniently changed even with respect to other cards on the same drum.

Apparatus for simultaneously holding more than one card is shown in Figures 7 and 8. As may be seen, a housing 400 is provided with a first plurality of orifices 402, a second plurality of orifices 404, a third plurality of orifices 406 and a fourth plurality of orifices 408. The orifices in each plurality may be vertically aligned with one another and are spaced from the orifices in the other pluralities in the direction of movement of the cards 10*a*, 10*b*, 10*c* and 10*d*. Air is adapted to be withdrawn from the orifices by apparatus shown in the previous figures and described above so as to produce a vacuum force at the orifices for retaining the cards 10*a*, 10*b*, 10*c* and 10*d* in fixed position.

By producing vacuum forces in all of the orifices, a plurality of cards may be simultaneously retained in fixed position against the housing 400. For example, cards 10*a*, 10*b*, 10*c* and 10*d* are shown as being respectively disposed in fixed position against the orifices 402, 404, 406 and 408. The leading edges of the cards 10*a*, 10*b*, 10*c* and 10*d* are disposed against the periphery of the drum 10. In this way, the cards 10*a*, 10*b*, 10*c* and 10*d* can be released in any order by the holding apparatus for subsequent movement with the drum 10. By way of illustration, the cards 10*c*, 10*b*, 10*a* and 10*d* can be released in that order for movement with the drum 10 by sequentially interrupting the vacuum pressure in the orifice 406, 404, 402 and 408. In this way, various types of processing operations such as holding, merging and sorting can be performed.

Although the hold station of the present invention has been illustrated as incorporated in a particular type of data processing system, the invention is clearly not limited to such a system. The principles and techniques involved in the present invention are clearly susceptible to numerous other applications which will be apparent to a person skilled in the art.

We claim:

1. In a system for processing data as represented by signal information on a plurality of information storage cards, the combination of, transport means for the card, a holding member mounted adjacent said transport means and having a surface spaced from said transport means to hold cards against movement upon the introduction of fluid to said surface, guide means coupled to the transport means for obtaining a transfer of the cards from the transport member to the guide means during the movement of the cards past the holding member, the guide means being provided with a length shorter than that of the cards and being constructed to minimize any holding force on the cards and means coupled to said holding member for introducing fluid to said surface of said holding member to cause a card on said guide means to be held against said surface of said holding member in position to be returned to said transport means upon an interruption in the introduction of fluid to said surface of said holding member.

2. In a system for processing data as represented by signal information on a plurality of information storage cards, the combination of, a rotatable drum for transporting the cards on its peripheral surface, a stationary holding member mounted adjacent said drum and having a surface spaced from the peripheral surface of said drum to retain cards in fixed position upon the introduction of vacuum pressure to the surface of the holding member, guide means coupled to the drum at a position contiguous to the holding member for obtaining a transfer of the cards to the guide member from the drum and provided with a length less than that of each card to retain at least a portion of the drum at all times during the movement of the cards over the guide means, and means coupled to the holding member for imposing a force on the surface of said holding member to cause a card on said guide means to be held against said surface of said holding member in position to be returned to said peripheral surface of said drum upon the termination of the force imposed at said surface of said holding member.

3. In a system for processing data as represented by signal information on a plurality of information storage cards, the combination of, a vacuum pressure rotatable drum constructed to transport cards on its peripheral surface, a stationary holding member mounted adjacent said drum, said holding member having a generally arcuate-shaped surface facing the peripheral surface of said drum and spaced from said peripheral surface to retain cards in fixed position upon the introduction of vacuum pressure to said arcuate surface, means including an inlet line for introducing a vacuum pressure to said arcuate surface of said holder, means included in said line for controlling the introduction of said vacuum pressure to said arcuate surface to cause a card to be stripped from said peripheral surface of said drum and held against said arcuate surface during the introduction of the vacuum pressure to said arcuate surface, and subsequently to cause such card to be returned to said peripheral surface upon an interruption in the introduction of the vacuum pressure to said arcuate surface, and means including a transducer coupled to the cards on the drum at a position before the holding member in the direction of movement of the cards for processing information on the cards to obtain an operation of the last mentioned means in accordance with the processed information.

4. In a system for processing data as represented by signal information on a plurality of information storage cards, the combination of, a vacuum pressure rotatable drum having a plurality of axially spaced annular orifices extending through its peripheral surface, means coupled to the drum for introducing a vacuum pressure to the interior of said drum to create a vacuum holding pressure through said orifices for supporting cards on the peripheral surface of said drum, a stationary holding member mounted adjacent said drum, said holding member having a generally arcuate-shaped surface facing the peripheral surface of said drum and spaced from said peripheral surface, said arcuate-shaped surface having a series of slots extending to the interior of said holding member, a guide member provided with a length less than the length of each card and disposed in coupled relationship to the periphery of the drum at a position near the holding member for obtaining a transfer of each card from the drum to the guide member for movement past the holding member, and means for introducing a vacuum pressure to said surface of said holding member to strip a card from said guide member and to cause such card to be held against said surface of said holding member in position to be returned to said peripheral surface of said drum upon the termination of such vacuum pressure at said surface of said holding member.

5. In a system for processing data as represented by signal information on a plurality of information storage cards, the combination of, a rotatable drum for transporting the cards on its peripheral surface, means coupled to the drum for providing a fluid pressure on the peripheral surface of the drum to retain the cards in fixed position on the periphery of the drum during the drum rotation, a stationary holding member mounted adjacent said drum and having a surface facing and spaced from the peripheral surface of said drum, pawl means positioned adjacent said drum and said holding member for stripping cards from the peripheral surface of said drum to bring such cards under the influence of said holding member, means coupled to the holding member for producing a fluid pressure on said surface of said holding member to cause a card stripped by said pawl means from said peripheral surface to be held against said surface of said holding member in position to be returned to said peripheral surface of said drum upon the termination of such fluid pressure on said surface of said holding member, and means including transducing means coupled to the cards on the drum for processing particular information on the transported cards to obtain a controlled operation of the last mentioned means in accordance with such processed information.

6. In a system for processing data as represented by signal information on a plurality of information storage cards, the combination of, a vacuum pressure rotatable drum having a plurality of axially spaced annular slots extending through its peripheral surface, and disposed relative to one another to provide at least one slot at each annular position, means coupled to the drum for introducing a vacuum pressure to the interior of said drum to create a vacuum holding pressure at said slots for supporting cards on the peripheral surface of said drum, a stationary holding member mounted adjacent said drum and having an arcuate-shaped surface facing and spaced from the peripheral surface of said drum, pawl means positioned adjacent said drum at the leading end of said holding member with respect to the direction of rotation of said drum, said pawl means including a series of fingers extending into said annular slots in said drum for stripping cards extending into said annular slots in said drum for stripping cards from said peripheral surface of said drum to bring such cards under the influence of said holding member, and means coupled to said card holding member for introducing a vacuum pressure to said surface of said holding member to cause a card stripped by said pawl means from said peripheral surface of said drum to be held against said arcuate-shaped surface of said holding member in position to be returned to said peripheral surface of said drum upon the termination of such vacuum pressure at said surface of said holding member.

7. In a system for processing data as represented by signal information on a plurality of information storage cards, the combination of, a vacuum pressure rotatable drum having a plurality of axially spaced annular slots extending through its peripheral surface and disposed relative to one another to provide at least one slot at each annular position, means coupled to the drum for introducing a vacuum pressure to the interior of said drum to create a vacuum holding pressure through said slots for supporting cards on the peripheral surface of said drum, a stationary holding member mounted adjacent said drum and having an arcuate-shaped surface facing and spaced from the peripheral surface of said drum, said arcuate-shaped surface of said holding member having a recess in a central portion thereof, pawl means positioned in said recess but spaced from said surface of said holding member, said pawl means including a plurality of fingers extending into said annular slots in said drum for stripping cards from said peripheral surface of said cards to bring such cards under the influence of said holding member, means coupled to the holding member for introducing a vacuum pressure to said surface of said holding member to cause a card stripped by said pawl means from said peripheral surface of said drum to be held against said arcuate-shaped surface of said holding member in position to be returned to said peripheral surface of said drum upon the termination of such vacuum pressure at said surface of said holding member, means including transducing means coupled to the cards on the periphery of the drum at a position before the holding member for processing information on the cards on the drum to control the operation of the last mentioned means in accordance with such processed information.

8. The combination defined in claim 7 in which the pawl means are spaced from said arcuate surface of said holding member by a distance equal to the thickness of at least two of such cards so that a card supported by said holding member blocks the vacuum pressure at said arcuate surface of the holding member and permits a second card on said drum to ride over said pawl means and past said holding member back to said drum.

9. In a system for processing data as represented by signal information on a plurality of information storage cards, the combination of, a rotatable drum, means coupled to the periphery of the drum for providing for the flow of fluid through the drum to obtain the fixed positioning of cards on the periphery of the drum during the drum rotation, means for withdrawing cards from the periphery of the drum and for returning the cards to the drum, the withdrawing means being provided with a length less than that of the cards to obtain the retention of at least a portion of the cards during the movement of the cards along the withdrawing means, holding means coupled to the card-withdrawing means for retaining the cards transferred from the drum in fixed position upon the introduction of fluid to the holding means, and means coupled to the holding means for providing for a flow of fluid through the holding means for retention of the cards in fixed position by the holding means upon the transfer of the cards from the drum by the card-withdrawing means, the holding means being disposed relative to the card-withdrawing means to control any further transfer of cards from the drum to the card-withdrawing means and back to the drum upon retention of one of the cards by the holding means.

10. The system as set forth in claim 9 in which the holding means are separated from the with-drawing means by a distance less than twice the thickness of the cards to prevent any further transfer of cards from the drum to the with-drawing means upon the retention of a card by the holding means.

11. The system as set forth in claim 9 in which the holding means are disposed relative to the with-drawing means for the passage of cards between the holding means and the with-drawing means and back to the drum and in which the holding means are separated from the with-drawing means by a distance greater than twice the thickness of the cards to provide for an initial retention of a first card by the holding means and a subsequent passage of cards along the with-drawing means between the first card and the with-drawing means and back to the drum.

12. The system as set forth in claim 9 in which means are provided to insure that the cards become retained in fixed position by the holding means only after the leading edges of the cards have been returned to a position under the influence of the flow of fluid through the drum for a transfer of the cards to the drum upon an interruption in the flow of fluid through the holding means.

13. In combination in a system for processing a plurality of cards each bearing data as represented by a plurality of bits of signal information, transport means constructed to carry the cards on its periphery, a card holder constructed to exert a fluid force simultaneously against a plurality of cards to retain the cards against movement with the transport means and in relationship to one another for a sequential release of the cards from the card holder back to the transport means in any order the same as or different from the order of movement of the cards to the drum, and means coupled to the transport means for lifting the cards from the periphery of the transport means for movement of the cards to a position away from the transport means and under the influence of the card holder and for subsequent movement of the cards back to the transport means to be carried by the transport means.

14. The combination set forth in claim 13 in which the transport means is a rotatable drum for holding the cards in fixed position on the periphery of the drum during the drum rotation and in which the card holder has a plurality of orifices each receiving a flow of fluid for holding a different one of the cards in fixed position against rotation on the periphery of the drum.

15. The combination set forth in claim 13 in which the transport means is a rotatable drum having orifices for the width-drawal of air through the orifices to produce a vacuum pressure on the periphery of the drum for holding the cards in fixed position on the periphery of the drum during the drum rotation, in which the card holder has a plurality of orifices each constructed for a withdrawal of air through the orifices to produce a sufficient force on the cards for holding the cards in fixed position against the force exerted on the cards by the drum, in which the lifting means is at least one pawl extending into the orifices in the drum at opposite ends and extending to a position near the card holder at a position intermediate the ends, and in which means are coupled to the drum and to the card holder for producing a vacuum force on the periphery of the drum and for producing vacuum forces at the different orifices in the card holder at controlled periods of time.

16. A system as set forth in claim 1 in which at least one finger is disposed in co-operative relationship with the transport means and the holding member at the forward end of the holding member in the direction of movement of the cards to obtain a transfer of cards from the transport means to the holding member for movement of the cards into position relative to the holding member for retention by the holding member against further movement.

17. A system as set forth in claim 9 in which at least one finger extends at one end to a position in contiguous relationship to the periphery of the drum to obtain a removal of cards from the periphery of the drum and in which the finger is disclosed at a position near to the holding member but separated from the holding member to obtain a movement of the cards past the holding member for a retention of the cards by the holding member.

18. In a system for processing data as represented by signal information on a plurality of information storage cards, the combination of, transport means for the cards, guide means coupled to the transport means and provided with a length less than that of the cards to remove the cards from the transport means and to obtain a retention of at least a portion of each card on the transport means during the movement of the card along the guide means, a stationary holding member mounted in contiguous relationship to the guide means to remove transported cards from the guide means and having a surface spaced from the guide means to retain the removed cards in fixed position on the holding member upon the introduction of a pneumatic force against the surface, and means coupled to the holding member for imposing a pneumatic force on the surface of the holding member to retain the removed cards on the holding member in position to return to the transport means upon the interruption of the pneumatic force.

19. In a system for processing data as represented by signal information on a plurality of information storage cards, the combination of, transport means for the cards, a stationary holding member mounted adjacent the transport means, guide means including at least one finger coupled to the transport means to provide a transfer of cards from the transport means to the guide means, the guide means being provided with a length less than that of the cards and with an arcuate shape, the holding member having a generally arcuate-shaped surface spaced from the guide means, there being at least one slot extending to the arcuate-shaped surface of the holding member from the interior of the holding member, and means coupled to the holding member for providing for a flow of fluid between the arcuate-shaped surface of the holding member and the interior of the holding member to retain cards transferred to the guide means in fixed position on the holding member until an interruption in the flow of fluid.

20. In a system for processing data as represented by signal information on a plurality of information storage cards, the combination of, transport means for the cards, guide means having a smooth contour and disposed in coupled relationship to the transport means and provided with a configuration and disposed relative to the transport means for providing a withdrawal of cards from the transport means, a movement of cards along the guide means and a subsequent return of the cards to the transport means, holding means including fluid-receiving means in the holding means and disposed in contiguous relationship to the guide means for retaining the cards on the holding means against movement along the guide means upon the introduction of fluid to the fluid-receiving means, and means coupled to the fluid-receiving means in the holding means for providing for a flow of fluid through the fluid-receiving means in the holding means to retain the cards on the holding means against movement until an interruption in the introduction of such fluid.

21. The combination as set forth in claim 1 in which the transport means is movable in a closed loop.

22. The combination set forth in claim 18 in which the transport means is movable and is constructed to retain the cards in fixed position on the transport means for movement with the transport means.

23. The combination set forth in claim 19 in which the transport means is movable and in which the transport means is constructed to obtain a movement of the cards with the transport means and in which the guide means is constructed for a portion of each card to engage the transport means at every position during the movement of the cards along the guide means.

24. The combination as set forth in claim 18 in which at least one input stack is disposed in coupled relationship to the transport means at a position before the holding member in the direction of movement of the cards to obtain a transfer of cards from the station to the transport means for movement toward the holding member and in which at least one output stack is disposed in coupled relationship to the transport means at a position after the transport means in the direction of movement of the cards to obtain a transfer of cards from the transport means to the output station after the movement of the cards past the holding member.

25. The combination set forth in claim 2 in which at least one input stack is disposed in contiguous relationship to the drum at a position in front of the holding member in the direction of rotation of the drum to provide a transfer of cards to the drum for movement with the drum toward the holding member and in which at least one output stack is disposed in contiguous relationship to the drum at a position behind the holding member in the direction of rotation of the drum to receive cards from the drum after the movement of the cards with the drum past the holding member.

26. The combination set forth in claim 19 in which means including an input stack are disposed in coupled relationship to the transport means at a position before the holding member in the direction of movement of cards to provide a controlled transfer of cards from the input stack to the transport means for movement toward the holding member and in which means including an output stack are disposed in coupled relationship to the transport means at a position after the holding member in the direction of movement of cards to provide a controlled transfer of cards from the transport means to the output stack after movement of the cards past the holding member.

27. In a system for processing data as represented by signal information on a plurality of information storage cards, the combination of, transport means for the cards, a stationary holding member mounted in contiguous relationship to the transport means to obtain a removal of transported cards from the transport means and having a surface to retain the removed cards in fixed position on the holding member upon the introduction of a pneumatic force against the surface, means coupled to the holding member for imposing a pneumatic force on the surface of the holding member to retain the removed cards on the holding member in position to be returned to the transport means upon the interruption of the pneumatic force, and means coupled to the cards on the transport means at a position before the holding member in the direction of movement of the cards for processing particular information on the cards to obtain a controlled imposition of the pneumatic force on the surface of the holding member in accordance with such processed information.

References Cited in the file of this patent

UNITED STATES PATENTS

| | | |
|---|---|---|
| 1,040,025 | Schlesinger | Oct. 1, 1912 |
| 2,752,154 | Nelson | June 26, 1956 |
| 2,806,695 | Carlisle | Sept. 17, 1957 |